United States Patent
Kumar et al.

(10) Patent No.: US 11,362,546 B2
(45) Date of Patent: Jun. 14, 2022

(54) SYSTEM, METHOD, AND UNIT FOR CONTROLLING CHARGING OF A LINE FOLLOWER ROBOT

(71) Applicant: Wipro Limited, Bangalore (IN)

(72) Inventors: Vijay Kumar, Bangalore (IN); Hemachandra Ramanath Bhat, Bangalore (IN); Thomas Chittakattu Ninan, Kerala (IN)

(73) Assignee: Wipro Limited, Bangalore (IN)

( * ) Notice: Subject to any disclaimer, the term of this patent is extended or adjusted under 35 U.S.C. 154(b) by 621 days.

(21) Appl. No.: 16/370,420

(22) Filed: Mar. 29, 2019

(65) Prior Publication Data

US 2020/0313468 A1   Oct. 1, 2020

(30) Foreign Application Priority Data

Mar. 29, 2019 (IN) .............................. 201941012642

(51) Int. Cl.
| | |
|---|---|
| *H02J 7/00* | (2006.01) |
| *H02J 50/80* | (2016.01) |
| *B25J 9/16* | (2006.01) |
| *B25J 5/02* | (2006.01) |
| *B60L 53/62* | (2019.01) |
| *B25J 19/00* | (2006.01) |
| *B60L 53/53* | (2019.01) |

(Continued)

(52) U.S. Cl.
CPC .............. *H02J 50/80* (2016.02); *B25J 5/007* (2013.01); *B25J 5/02* (2013.01); *B25J 9/1664* (2013.01); *B25J 19/005* (2013.01); *B60L 53/305* (2019.02); *B60L 53/53* (2019.02); *B60L 53/62* (2019.02)

(58) Field of Classification Search
CPC ..... Y02T 90/12; Y02T 90/16; Y02T 10/7072; Y02T 10/70; H02J 50/80; H02J 7/00712; H02J 7/0048; H02J 7/0036; H02J 7/0013; H02J 7/00034; B60L 53/62; B60L 53/53; B60L 53/305; B25J 19/005; B25J 5/02; B25J 5/007
USPC ............................................ 320/109; 701/22
See application file for complete search history.

(56) References Cited

U.S. PATENT DOCUMENTS

| | | |
|---|---|---|
| 8,977,393 B1 | 3/2015 | Kohler |
| 10,145,881 B1 * | 12/2018 | Salter .................. G05D 1/0212 |

(Continued)

*Primary Examiner* — Zixuan Zhou
(74) *Attorney, Agent, or Firm* — Finnegan, Henderson, Farabow, Garrett & Dunner, LLP

(57) ABSTRACT

The present disclosure is related to field of charging of a line follower robot, disclosing method, system, unit for controlling charging of the line follower robot. The charging control unit includes a line follower robot configured with a charging control system. The line follower robot follows a pre-programmed path for performance of a pre-programmed task. The line follower robot includes a ground contact wheel in connection with the pre-programmed path for an entire duration of performance of the pre-programmed task and a segmented wheel in connection with a power-communication track. The segmented wheel is divided into an equal number of different contact surfaces, and the different contact surfaces comprises a charging contact surface, a transmit contact surface, and a receive contact surface. The charging control unit further includes the power-communication-track constructed parallel to the pre-programmed path.

20 Claims, 5 Drawing Sheets

(51) Int. Cl.
*B60L 53/30* (2019.01)
*B25J 5/00* (2006.01)

(56) References Cited

U.S. PATENT DOCUMENTS

| | | | |
|---|---|---|---|
| 10,532,663 B2* | 1/2020 | Ricci | B60L 53/665 |
| 2007/0113921 A1* | 5/2007 | Capizzo | B60K 15/067 |
| | | | 141/231 |
| 2014/0292274 A1 | 10/2014 | Dorval et al. | |

* cited by examiner

SYSTEM, METHOD, AND UNIT FOR CONTROLLING CHARGING OF A LINE FOLLOWER ROBOT

TECHNICAL FIELD

The present subject matter is related in general to the field of line follower robots and more particularly, but not exclusively to a method, system, and unit for controlling charging of a line follower robot.

BACKGROUND

Generally, line follower robots are used in ware houses, store rooms for material movement or inspection. The line follower robots are normally operated with battery and are required to be recharged after certain time of operation. The recharging or charging of the line follower robot causes shutdown time for the line follower robots as the line follower robots have to be displaced from their pre-programmed path and connected to a power source for charging in a different location. The shutdown time of the line follower robot halts current operation or task of the line follower robots thereby increasing the overall time required for the performance of the operation or the task and decreasing the efficiency of the line follower robot. During the shutdown time, a backup line follower robot may have to be used for uninterrupted operation. However, the use of the backup line follower robot involves usage of additional resources for the performance of the operation or task.

The existing art discloses various mechanisms to ease charging operation of the line follower robot. In order to save time, effort, and resources, charging stations are installed for efficient charging of robots including line follower robots. However, this also requires the line follower robots to halt the operation and visit the nearest charging station and spend stipulated time for charging. Also, charging stations requires a heavy step-up and working space for proper functioning. Thus, during the charging operation, the line follower robots are required to halt the performance of task, wait for a stipulated amount of time if more line follower robots are in queue for charging at the charging station, and recharge for further working.

Thus the existing methods of charging the line follower robot are time consuming, require a heavy setup, and usage of additional resources thereby resulting in decreased efficiency of the line follower robot.

SUMMARY

One or more shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

Disclosed herein is a method of controlling charging of a line follower robot. The method includes identifying, by a charging control system, a contact surface of a segmented wheel of the line follower robot in connection with a power-communication track. The power-communication track is parallel to a pre-programmed path of the line follower robot and carries a power signal and a communication signal. Further, the method includes charging, by the charging control system, a battery of the line follower robot when a charging contact surface of the segmented wheel is in connection with the power-communication track and monitoring, by the charging control system, a level of the battery of the line follower robot. Finally, the method includes terminating, by the charging control system, the charging of the battery of the line follower robot when the level of the battery of the line follower robot is above an optimum battery level.

Further, the present disclosure comprises a charging control system for controlling charging of a line follower robot. The system includes a processor; and a memory communicatively coupled to the processor. The memory stores processor instructions, which, on execution, causes the processor to identify a contact surface of a segmented wheel of the line follower robot in connection with a power-communication track. The power-communication track is parallel to a pre-programmed path of the line follower robot and carries a power signal and a communication signal. The processor is further caused to charge battery of the line follower robot when a charging contact surface of the segmented wheel is in connection with the power-communication track and monitor a level of the battery of the line follower robot. Finally, the processor is caused to terminate the charging of the battery of the line follower robot when the level of the battery of the line follower robot is above an optimum battery level.

Furthermore, the present disclosure comprises a charging control unit for controlling charging of a line follower robot. The charging control unit includes a line follower robot configured with a charging control system. The line follower robot follows a pre-programmed path for performance of a pre-programmed task. The line follower robot includes a ground contact wheel in connection with the pre-programmed path for an entire duration of performance of the pre-programmed task and a segmented wheel in connection with a power-communication track. The segmented wheel is divided into an equal number of different contact surfaces, and the different contact surfaces comprises a charging contact surface, a transmit contact surface, and a receive contact surface; and the power-communication track constructed parallel to the pre-programmed path.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
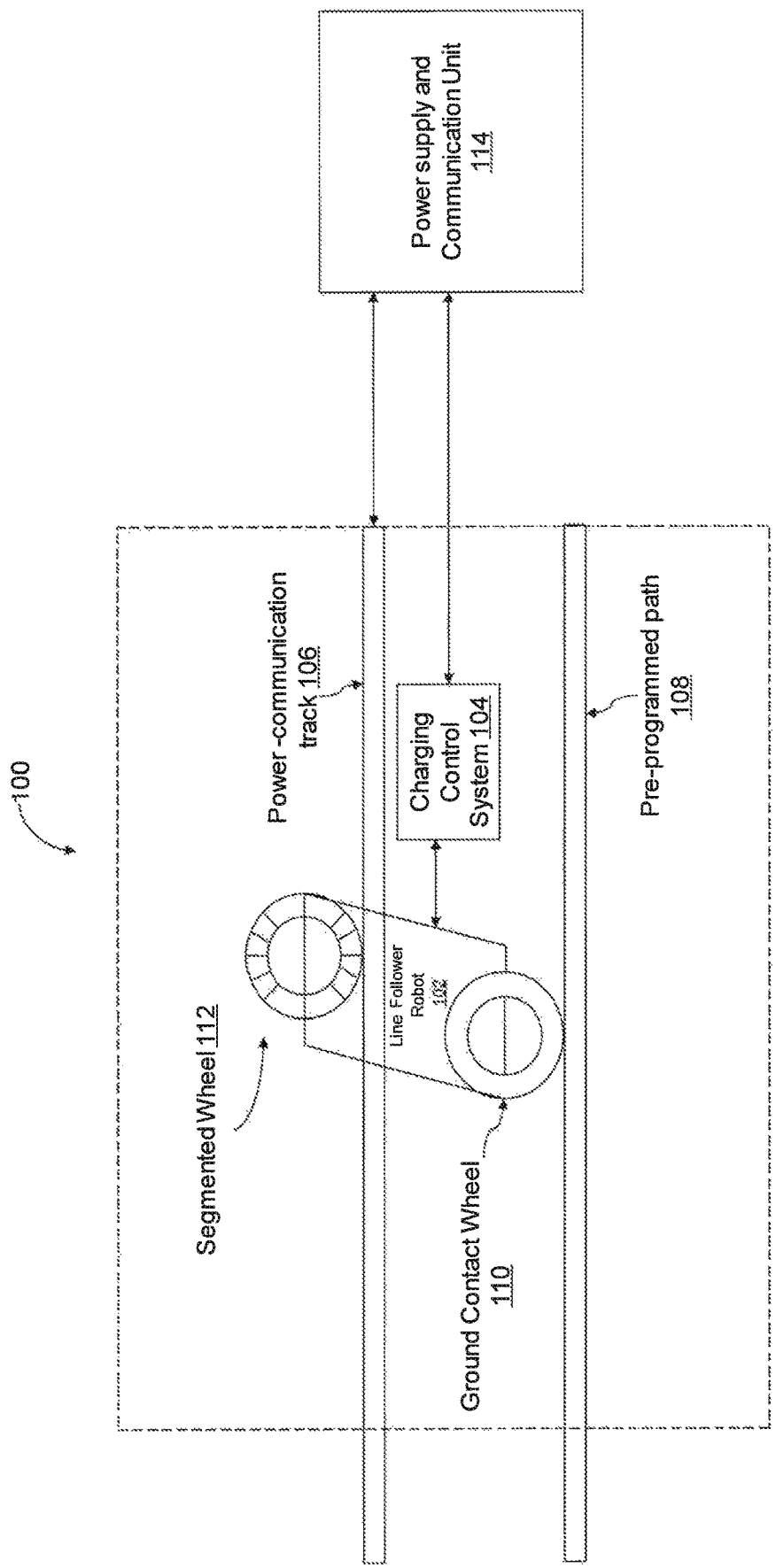
FIG. 1 shows an exemplary arrangement of a charging control unit for controlling charging of a line follower robot in accordance with some embodiments of the present disclosure.

It should be appreciated by those skilled in the art that any block diagram herein represents conceptual views of illustrative systems embodying the principles of the present subject matter. Similarly, it will be appreciated that any flow chart, flow diagram, state transition diagram, pseudo code, and the like represent various processes which may be substantially represented in computer readable medium and executed by a computer or a processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure provides a method, a system, and a unit for controlling charging of a line follower robot. The line follower robot includes a ground contact wheel in connection with a pre-programmed path for an entire duration of performance of a pre-programmed task. The line follower robot also includes a segmented wheel. The segmented wheel is divided into an equal number of different contact surfaces. The different contact surfaces comprise a charging contact surface, a transmit contact surface, and a receive contact surface. Each contact surface is separated by an insulation surface.

At first, a contact surface of a segmented wheel which is in connection with a power-communication track is identified. The power-communication track is constructed parallel to the pre-programmed path of the line follower robot and carries a power signal and a communication signal. In an embodiment, a type of contact surface in connection with the power-communication track is identified using a slot sensor mechanism.

In an embodiment, whether the charging contact surface of the segmented wheel is in connection with the power-communication track is identified by checking if a Direct Current (DC) voltage level is present at the contact surface of the segmented wheel. Also, whether the receive contact surface of the segmented wheel is in connection with the power-communication track is identified by checking for reception of a communication message at the receive contact surface of the segmented wheel.

Upon identifying that the charging contact surface is in connection with the power-communication track, a battery of the line follower robot is charged. The power-communication track is powered by a power supply and communication unit to charge the battery of the line follower robot when the charging contact surface is in connection with the power-communication track. Further, level of the battery of the line follower robot is monitored. If the level of the battery of the line follower robot is above an optimum battery level, then the charging of the line follower robot is terminated. As the power-communication track is constructed parallel to the pre-programmed path of the line follower robot and is in connection with at least one contact surface of the segmented wheel of the line follower robot, the line follower robot is not required to be displaced from its pre-programmed path for charging. The continuous monitoring of the level of the battery of the line follower robot ensures that the battery of the line follower robot is charged when the level of the battery is below the optimum battery level. The line follower robot is charged during the performance of its pre-programmed task whenever required. Thus, the line follower robot is not required to be halted during the performance of the pre-programmed task which saves substantial time and improves the speed and efficiency in the performance of the pre-programmed task.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary arrangement of a charging control unit 100 for controlling charging of a line follower robot 102 in accordance with some embodiments of the present disclosure.

The charging control unit 100 may include a line follower robot 102, a charging control system 104, and a power-communication track 106. The line follower robot 102 may be configured to perform a pre-programmed task. The line follower robot 102 may follow a pre-programmed path 108 to perform the pre-programmed task. The power-communication track 106 may be constructed parallel to the pre-programmed path 108. The power-communication track 106 may be configured to carry power signals and communication signals. The power-communication track 106 may be constructed using any conductive material for carrying both communication signal and power signal. In an embodiment, the line follower robot 102 may be configured with the charging control system 104 to charge a battery of the line follower robot 102.

The line follower robot 102 may include a ground contact wheel 110 and a segmented wheel 112. The ground contact wheel 110 may be in connection with the pre-programmed path 108 for an entire duration of performance of the pre-programmed task. The segmented wheel 112 may be in connection with the power-communication track 106 for the entire duration of performance of the pre-programmed task. The segmented wheel 112 may be divided into an equal number of different contact surfaces. The different contact surfaces may include a charging contact surface, a transmit contact surface, and a receive contact surface. The charging contact surface may be constructed from any conductive material. The different contact surfaces may be separated by an insulating surface.

In an example, the different contact surfaces may be constructed on the segmented wheel 112 in the following sequence, charging contact surface—transmit contact surface—receive contact surface—charging contact surface. As the segmented wheel 112 rotates or moves on the power-communication track 106, the charging contact surface, the transmit contact surface, and the receive contact surface may be in connection with the power-communication track 106 in the above-mentioned sequence.

Further, the power-communication track 106 may be powered by a power supply and communication unit 114. The power-communication track 106 may carry power signals and communication signals. The charging control system 104 may communicate with the power supply and communication unit 114 to charge the battery of the line follower robot 102. Power supply may be provided by the power supply and communication unit 114 using any power supply such as Alternating Current/Direct Current (AC/DC) converters, Direct Current/Direct Current (DC/DC) converters, solar panel, or battery. The communication component of the power supply and communication unit 114 may perform communication between the line follower robot 102 and the power supply and communication unit 114, between different line follower robots, and between different system components. The communication component may be any unit such as Local Area Network (LAN), Recommend Standard 232 (RS232), or Recommend Standard 422 (RS422).

In an embodiment, the charging control system 104 may continuously monitor a level of the battery of the line follower robot 102. If the level of the battery of the line follower robot 102 is below an optimum battery level, the charging control system 104 may transmit at least one of the level of the battery and a message to charge the battery of the line follower robot 102 to the power supply and communication unit 114. The level of the battery and the message may be transmitted on the power-communication track 106 when the transmit contact surface of the segmented wheel 112 is in connection with the power-communication track 106. The charging control system 104 may enable charging of the battery of the line follower robot 102 when the charging contact surface is in connection with the power-communication track 106.

Figure 2:
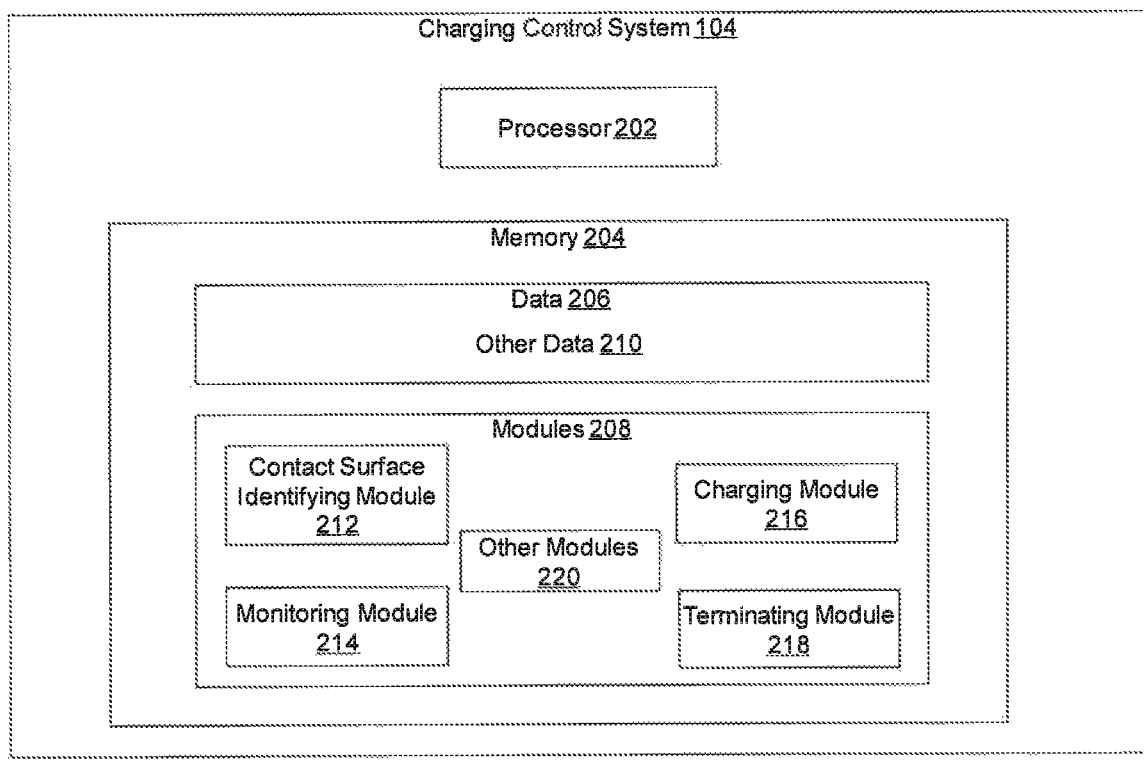
FIG. 2 shows a detailed block diagram of a charging control system for controlling charging of a line follower robot in accordance with some embodiments of the present disclosure.

FIG. 2 shows a detailed block diagram of the charging control system 104 for controlling charging of the line follower robot 102 in accordance with some embodiments of the present disclosure.

The charging control system 104 may include a processor 202 and a memory 204. The charging control system 104 may include data 206 and modules 208. As an example, the data 206 may be stored in the memory 204 configured in the charging control system 104 as shown in the FIG. 2. In one embodiment, the data 206 may include level of the battery of the line follower robot 102, location of the line follower robot 102, and task to be performed by the line follower robot 102, and other data 210.

In some embodiments, the data 206 may be stored in the memory 204 in form of various data structures. Additionally, the data 206 can be organized using data models, such as relational or hierarchical data models. The other data 210 may store data, including temporary data and temporary files, generated by the modules 208 for performing the various functions of the charging control system 104.

In some embodiments, the data 206 stored in the memory 204 may be processed by the modules 208 of the charging control system 104. The modules 208 may be stored within the memory 204. In an example, the modules 208 communicatively coupled to the processor 202 configured in the charging control system 104, may also be present outside the memory 204 and implemented as hardware. As used herein, the term modules 208 may refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 208 may include, for example, a contact surface identifying module 212, a monitoring module 214, a charging module 216, a terminating module 218, and other modules 220. The other modules 220 may be used to perform various miscellaneous functionalities of the charging control system 104. It will be appreciated that such aforementioned modules 208 may be represented as a single module or a combination of different modules.

In some embodiments, the contact surface identifying module 212 may identify a contact surface of the segmented wheel 112 in connection with the power-communication track 106. The contact surface identifying module 212 may identify type of contact surface of the segmented wheel 112 in connection with the power-communication track 106 using a slot sensor mechanism. In an example, an Infrared (IR) slot sensor may be used as in the slot sensor mechanism. An IR receiver may be fixed on a stationary part of the line follower robot 102. Further, different IR transmitters may be placed on the segmented wheel 112 in alignment to each contact surface. Each IR transmitter in alignment with corresponding contact surface may emit a pre-defined frequency which is different from frequency emitted by other IR transmitters. The IR transmitter aligned to the charging contact surface may transmit one particular frequency, the IR transmitter aligned to the transmit contact surface may transmit another frequency, and the IR transmitter aligned to the receive contact surface may transmit yet another frequency. Each of the IR transmitters may come in to line of sight with the IR receiver whenever that particular contact surface is in contact with the power-communication track 106. The contact surface identifying module 212 may check for the frequency received by the IR receiver and determine which contact surface is in connection with the power-communication track 106 based on the received frequency.

In another embodiment, the contact surface identifying module 212 may identify whether the charging contact surface of the segmented wheel 112 is in connection with the power-communication track 106 by checking if a Direct Current (DC) voltage level or a valid voltage level is present at the contact surface of the segmented wheel 112. Additionally, the contact surface identifying module 212 may identify whether the receive contact surface of the segmented wheel 112 is in connection with the power-communication track 106 by checking for reception of a communication message at the receive contact surface of the segmented wheel 112.

In an embodiment, the contact surface identifying module 212 may perform a continuity check to identify the contact surface in connection with the power-communication track 106. At first, the contact surface identifying module 212 may measure voltage level on the contact surface of a segmented wheel 112 which is in connection with the power-communication track 106. If a valid voltage level is detected at the contact surface, then the contact surface in connection with the power-communication track 106 may be identified as the charging contact surface. The voltage level may be considered as a valid voltage level if the measured voltage level is above a pre-defined voltage level.

If valid voltage level is not detected at the contact surface in connection with the power-communication track 106, then the contact surface identifying module 212 may receive an input from the slot sensor mechanism regarding the contact surface in connection with the power-communication track 106. The slot sensor mechanism may identify that the transmit contact surface is in connection with the power-communication track 106. If the transmit contact surface is not identified as being in connection with the power-communication track 106, the contact surface identifying module 212 may wait for reception of a communication message from the power supply and communication unit 114 or other line follower robots. If a communication message is received at the contact surface, then the contact surface identifying module 212 may identify that the contact surface in connection with the power-communication track 106 is the receive contact surface. If none of the different contact surfaces is identified as being in connection with the power-communication track 106, then the contact surface identifying module 212 may repeat the continuity check as the segmented wheel 112 moves along the pre-programmed path 108.

After identifying that the charging contact surface is in connection with the power-communication track 106, the charging module 216 may charge the battery of the line follower robot 102. The power supply and communication unit 114 may act as a power source and provide power signal on the power-communication track 106. The charging module 216 may charge the battery of the line follower robot 102 through the charging contact surface of the segmented wheel 112 in connection with the power-communication track 106.

Further, the monitoring module 214 may continuously monitor the battery of the line follower robot 102. If the level of the battery of the line follower robot 102 is above an optimum battery level, the terminating module 218 may terminate the charging of the battery of the line follower robot 102. In order to terminate the charging of the battery, the terminating module 218 may transmit a message to the power supply and communication unit 114 to stop the supply of the power. On the other hand, if the level of the battery of the line follower robot 102 is not equal to or above the optimum battery level, the charging module 216 may transmit a message to charge the battery of the line follower robot 102 to the power supply and communication unit 114. The power supply and communication unit 114 may continue providing the power signal on the power and communication track 106 and the battery of the line follower robot 102 may continue getting charged through the charging contact surface until the level of the battery of the line follower robot 102 is equal to the optimum battery level.

In an example, consider a line follower robot configured for inspecting a store room. In order to perform the inspection, the line follower robot may need to move around the store room with defined structure. The line follower robot may be required to move along a pre-programmed path to reach to particular points in the store room to inspect storage. In this scenario, the line follower robot may consume its backup power while moving around the store room and the backup power may be consumed completely at one point of time. In the existing systems, the line follower robot is required to be moved to a particular place where a charging power source is available. Also, the line follower robot needs to get connected to the charging power source in order to get its backup power source charged. This needs the line follower robot to halt the performance of its task (storage inspection) while charging the backup power source.

To solve this problem, the line follower robot 102 may be configured with the charging control system 104. The power-communication track 106 may be constructed parallel to the pre-programmed path 108 of the line follower robot 102. The segmented wheel 112 of the line follower robot 102 may be in constant connection with the power-communication track 106. When the battery of the line follower robot 102 is below the threshold optimum value, the battery of the line follower robot 102 may be charged through the charging contact surface of the segmented wheel 112, while the line follower robot 102 is performing inspection of the store room. Thus, the line follower robot 102 is not required to halt the inspection of store room resulting in increased efficiency and speed of the line follower robot 102 in performance of its task of store room inspection.

Figure 3:
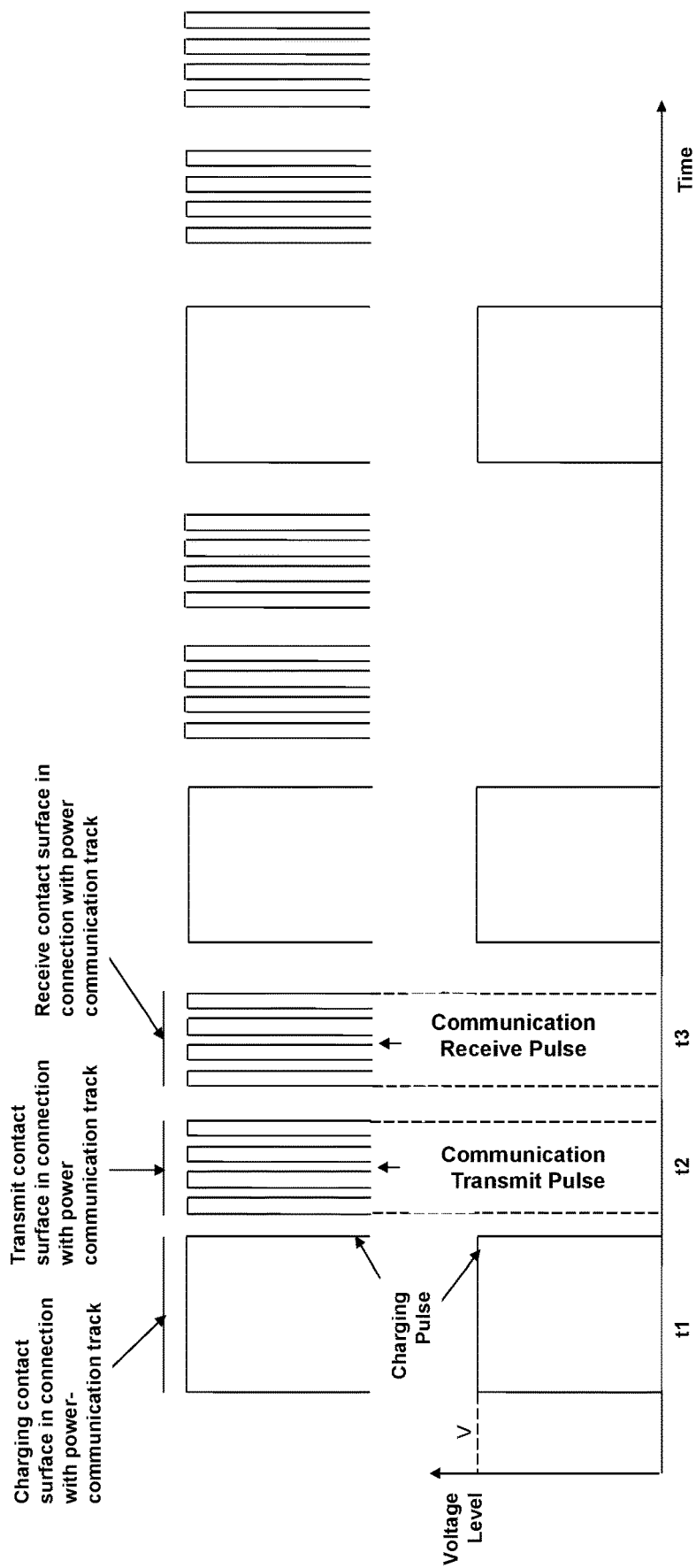
FIG. 3 shows exemplary waveforms for charging signal/power signal and communication signal in accordance with some embodiments of the present disclosure.

FIG. 3 shows exemplary waveforms for charging signal/power signal and communication signals in accordance with some embodiments of the present disclosure. As shown in the FIG. 3, when the charging contact surface is in connection with the power-communication track 106, a charging pulse of voltage level, V, may be provided by the power supply and communication unit 114 to the charging contact surface of the segmented wheel 112 for time period $t_1$. As the segmented wheel 112 moves or rotates, different contact surfaces of the segmented wheel 112 may be connected with the power-communication track 106. In one embodiment, after the charging contact surface, the transmit contact surface of the segmented wheel 112 may be in connection with the power-communication track 106.

As shown in the FIG. 3, communication transmit pulses may be transmitted by the line follower robot 102 for time period, $t_2$, at the transmit contact surface when the transmit contact surface is in connection with the power-communication track 106. After the transmit contact surface, the receive contact surface of the segmented wheel 112 may be in connection with the power-communication track 106.

As shown in the FIG. 3, communication receive pulses may be received by the line follower robot 102 for time period, $t_3$, when the receive contact surface is in connection with the power-communication track 106. After the receive contact surface, again the charging contact surface may be in connection in with the power-communication track 106 as the segmented wheel 112 moves or rotates. Thus, the segmented wheel 112 may be in connection with the power-communication track 106 during the entire duration of performance of the pre-programmed task.

Figure 4:
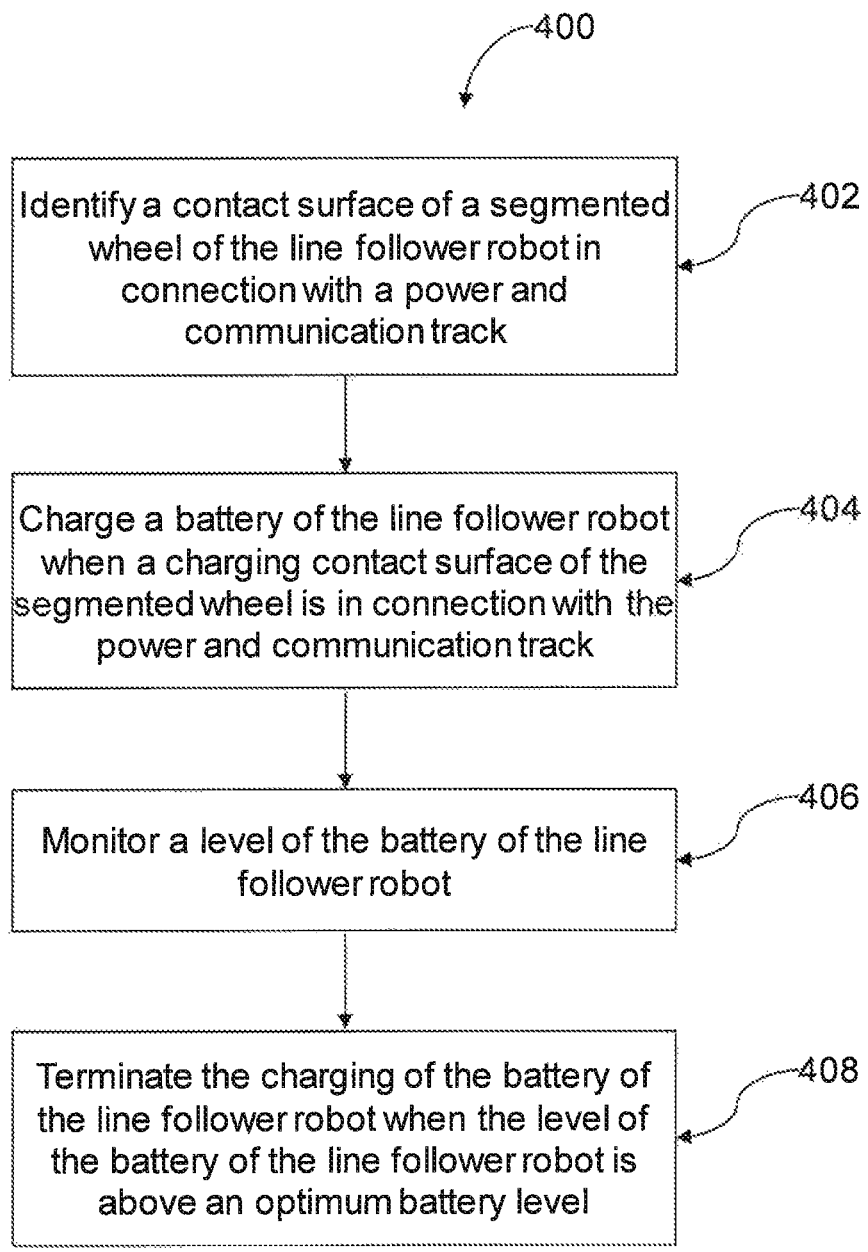
FIG. 4 shows a flowchart illustrating a method of controlling charging of a line follower robot in accordance with some embodiments of the present disclosure.

FIG. 4 shows a flowchart illustrating a method of controlling charging of a line follower robot 102 in accordance with some embodiments of the present disclosure.

The order in which the method 400 is described is not intended to be construed as a limitation, and any number of the described method blocks can be combined in any order to implement the method 400. Additionally, individual blocks may be deleted from the methods without departing from the spirit and scope of the subject matter described herein. Furthermore, the method 400 can be implemented in any suitable hardware, software, firmware, or combination thereof.

At block 402, the method 400 may include identifying, by a processor 202 of the charging control system 104, a contact surface of a segmented wheel 112 of the line follower robot 102 in connection with a power-communication track 106. The power-communication track 106 may be parallel to a pre-programmed path 108 of the line follower robot 102 and may carry a power signal and a communication signal. The contact surface in connection with the power-communication track 106 may be identified using a slot sensor mechanism. In one embodiment, the identifying of the contact surface may be implemented by the contact surface identifying module 212. The working of the contact surface identifying module 212 is explained in detail in conjunction with the FIG. 1.

At block 404, the method 400 may include charging, by a processor 202 of the charging control system 104, a battery of the line follower robot 102 when a charging contact surface of the segmented wheel 112 is in connection with the power-communication track 106. In one embodiment, a message to charge the battery of the line follower robot 102 may be transmitted to the power supply and communication unit 114 when the level of the battery is below an optimum battery level. In one embodiment, the charging of the battery of the line follower robot 102 may be implemented by the charging module 216. The working of the charging module 216 is explained in detail in conjunction with the FIG. 1.

At block 406, the method 400 may include monitoring, by a processor 202 of the charging control system 104, a level of the battery of the line follower robot 102. In one embodiment, the monitoring of the level of the battery of the line follower robot 102 may be implemented by the monitoring module 214. The working of the monitoring module 214 is explained in detail in conjunction with the FIG. 1.

At block 408, the method 400 may include terminating, by a processor 202 of the charging control system 104, the charging of the battery of the line follower robot 102 when the level of the battery of the line follower robot 102 is above the optimum battery level. In one embodiment, the terminating of the charging of the battery of the line follower robot 102 may be implemented by the terminating module 218. The working of the terminating module 218 is explained in detail in conjunction with the FIG. 1.

As illustrated in FIG. 4, the method 400 includes one or more blocks illustrating a method of controlling charging of a line follower robot 102. The method 400 may be described in the general context of computer-executable instructions. Generally, computer-executable instructions can include routines, programs, objects, components, data structures, procedures, modules, and functions, which perform functions or implement abstract data types.

Figure 5:
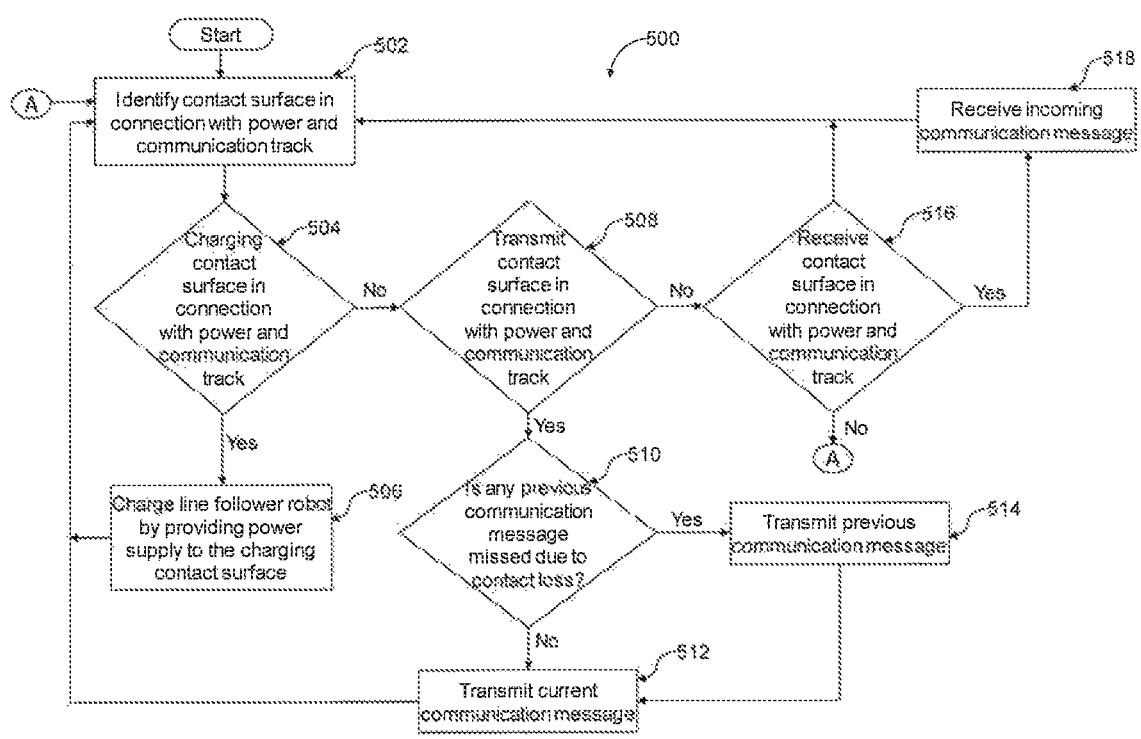
FIG. 5 shows a flowchart illustrating another method of controlling charging of a line follower robot in accordance with some embodiments of the present disclosure.

FIG. 5 shows a flowchart illustrating another method of controlling charging of a line follower robot 102 in accordance with some embodiments of the present disclosure.

The order in which the method 500 is described is not intended to be construed as a limitation, and any number of the described method blocks can be combined in any order to implement the method 500. Additionally, individual blocks may be deleted from the methods without departing from the spirit and scope of the subject matter described herein. Furthermore, the method 500 can be implemented in any suitable hardware, software, firmware, or combination thereof.

At block 502, the method 500 may include identifying, by a processor 202 of the charging control system 104, a contact surface of a segmented wheel 112 of the line follower robot 102 in connection with a power-communication track 106. The power-communication track 106 may be parallel to a pre-programmed path 108 of the line follower robot 102 and may carry a power signal and a communication signal. The contact surface in connection with the power-communication track 106 may be identified using a slot sensor mechanism. In one embodiment, the identifying of the contact surface may be implemented by the contact surface identifying module 212. The working of the contact surface identifying module 212 is explained in detail in conjunction with the FIG. 1.

At block 504, the method may include identifying, by a processor 202 of the charging control system 104, if the charging contact surface of the segmented wheel 112 is in connection with the power-communication track 106. In one embodiment, whether the charging contact surface is in connection with the power-communication track 106 may be identified using a slot sensor mechanism. In another embodiment, whether the charging contact surface of the segmented wheel 112 is in connection with the power-communication track 106 may be identified by checking if a DC voltage level or a valid voltage level is present at the contact surface of the segmented wheel 112. If the valid voltage level is detected at the contact surface, then the contact surface in connection with the power-communication track 106 may be identified as the charging contact surface. The voltage level may be considered as a valid voltage level if the measured voltage level is above a pre-defined voltage level.

If the charging contact surface of the segmented wheel 112 is identified to be in connection with the power-communication track 106, at block 506, the method may include charging, by the processor 202 of the charging control system 104, the battery of the line follower robot 102 using the power supply or power signal provided on the power-communication track 106 by the power supply and communication unit 114.

If the charging contact surface is not identified to be in connection with the power-communication track 106, then, at block 508, the method may include identifying, by the processor 202 of the charging control system 104, if transmit contact surface of the segmented wheel 112 is in connection with the power-communication track 106. In one embodiment, whether the transmit contact surface is in connection with the power-communication track 106 may be identified using a slot sensor mechanism.

If the transmit contact surface is identified to be in connection with the power-communication track 106, then, at block 510, the method may include checking, by the processor 202 of the charging control system 104, if any previous communication message has missed transmission due to contact loss between the transmit contact surface of the segmented wheel 112 and the power-communication track 106. The missed transmission of the previous communication message may be checked based on transmission status of the previous communication message. The transmission status may be identified as 'unsuccessful' if an acknowledgement message is not received at the receive contact surface immediately after the transmission of the previous communication message. On the other hand, the transmission status may be identified as 'successful' if an acknowledgement message is received at the receive contact surface immediately after the transmission of the previous communication message.

At block 512, the method may include transmitting, by the processor 202 of the charging control system 104, a current communication message on the power-communication track 106 through the transmit contact surface of the segmented wheel 112 if the transmission status of the previous communication message is identified as 'successful'.

At block 514, the method may include transmitting, by the processor 202 of the charging control system 104, the previous communication message on the power-communication track 106 if the transmission status is identified as 'unsuccessful'.

At block 516, the method may include identifying, by the processor 202 of the charging control system 104, if the receive contact surface is in connection with the power-communication track 106. In one embodiment, whether the receive contact surface is in connection with the power-communication track 106 may be identified using a slot sensor mechanism. In another embodiment, whether the receive contact surface of the segmented wheel 112 is in connection with the power-communication track 106 may be identified by checking for reception of a communication message at the receive contact surface of the segmented wheel 112. If the receive contact surface is not in connection with the power-communication track 106, the method may loop back to block 502 for identifying the contact surface in connection with the power-communication track 106.

At block 518, the method may include receiving, by the processor 202 of the charging control system 104, an incoming communication message on the power-communication track 106 through the receive contact surface of the segmented wheel 112 if the receive contact surface is in connection with the power-communication track 106. Upon successful reception of the incoming communication message, the method may include transmitting, by the processor 202 of the charging control system 104, an acknowledgement message, through the transmit contact surface on the power-communication track 106.

As illustrated in FIG. 5, the method 500 includes one or more blocks illustrating a method of controlling charging of a line follower robot 102. The method 500 may be described in the general context of computer-executable instructions. Generally, computer-executable instructions can include routines, programs, objects, components, data structures, procedures, modules, and functions, which perform functions or implement abstract data types.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method, a system, and a unit for controlling charging of a line follower robot 102. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A method of controlling charging of a line follower robot, the method comprising:
   identifying, by a charging control system, a contact surface of a segmented wheel of the line follower robot in connection with a power-communication track, wherein the power-communication track is parallel to a pre-programmed path of the line follower robot and carries a power signal and a communication signal;
   charging, by the charging control system, a battery of the line follower robot when a charging contact surface of the segmented wheel is in connection with the power-communication track;
   monitoring, by the charging control system, a level of the battery of the line follower robot; and
   terminating, by the charging control system, the charging of the battery of the line follower robot when the level of the battery of the line follower robot is above an optimum battery level.

2. The method of claim 1, further comprising:
   monitoring, by the charging control system, the level of the battery of the line follower robot; and
   transmitting, by the charging control system, to a power supply and communication unit, a message to charge the battery of the line follower robot when the level of the battery is below the optimum battery level.

3. The method of claim 1, wherein the segmented wheel is divided into an equal number of different contact surfaces, and wherein the different contact surfaces comprises the charging contact surface, a transmit contact surface, and a receive contact surface, and wherein each contact surface is separated by an insulation surface.

4. The method of claim 1, wherein a type of contact surface in connection with the power-communication track is identified using an Infrared (IR) slot sensor mechanism fixed on the segmented wheel.

5. The method of claim 1, wherein identifying whether the charging contact surface of the segmented wheel is in connection with the power-communication track, to charge the battery of the line follower robot, comprises checking if a Direct Current (DC) voltage level is present at the contact surface of the segmented wheel.

6. The method of claim 3, wherein identifying whether the receive contact surface of the segmented wheel is in connection with the power-communication track comprises checking for reception of a communication message at the receive contact surface of the segmented wheel.

7. The method of claim 3, further comprising:
identifying, by the charging control system, the transmit contact surface of the segmented wheel is in connection with the power-communication track;
checking, by the charging control system, for a transmission status of a previous communication message transmitted at the transmit contact surface of the segmented wheel;
transmitting, by the charging control system, the previous communication message on the power-communication track in absence of reception of an acknowledgement message at the receive contact surface of the segmented wheel; and
transmitting, by the charging control system, a current communication message on the power-communication track through the transmit contact surface of the segmented wheel.

8. The method of claim 3, further comprising:
identifying, by the charging control system, the receive contact surface of the segmented wheel is in connection with the power-communication track;
receiving, by the charging control system, an incoming communication message on the power-communication track through the receive contact surface of the segmented wheel; and
transmitting, by the charging control system, through the transmit contact surface, an acknowledgement message on the power-communication track on successful reception of the incoming communication message.

9. A charging control system for controlling charging of a line follower robot, the charging control system comprising:
a processor; and
a memory communicatively coupled to the processor, wherein the memory stores processor instructions, which, on execution, causes the processor to:
identify a contact surface of a segmented wheel of the line follower robot in connection with a power-communication track, wherein the power-communication track is parallel to a pre-programmed path of the line follower robot and carries a power signal and a communication signal;
charge a battery of the line follower robot when a charging contact surface of the segmented wheel is in connection with the power-communication track;
monitor a level of the battery of the line follower robot; and
terminate the charging of the battery of the line follower robot when the level of the battery of the line follower robot is above an optimum battery level.

10. The charging control system of claim 9, wherein the processor is further caused to:
monitor the level of the battery of the line follower robot;
transmit to a charging and communication unit, a message to charge the battery of the line follower robot when the level of the battery is below the optimum battery level.

11. The charging control system of claim 9, wherein the segmented wheel is divided into an equal number of different contact surfaces, wherein the different contact surfaces comprises the charging contact surface, a transmit contact surface, and a receive contact surface, and wherein each contact surface is separated by an insulation surface.

12. The charging control system of claim 9, wherein a type of contact surface in connection with the power-communication track is identified using an Infrared (IR) slot sensor mechanism fixed on the segmented wheel.

13. The charging control system of claim 9, wherein the processor identifies whether the charging contact surface of the segmented wheel is in connection with the power-communication track, to charge the battery of the line follower robot, by checking if a Direct Current (DC) voltage level is present at the contact surface of the segmented wheel.

14. The charging control system of claim 11, wherein the processor identifies whether the receive contact surface of the segmented wheel is in connection with the power-communication track by checking for reception of a communication message at the receive contact surface of the segmented wheel.

15. The charging control system of claim 11, wherein the processor is further caused to:
identify the transmit contact surface of the segmented wheel is in connection with the power-communication track;
check for a transmission status of a previous communication message transmitted at the transmit contact surface of the segmented wheel;
transmit the previous communication message on the power-communication track in absence of reception of an acknowledgement message at the receive contact surface of the segmented wheel; and
transmit a current communication message on the power-communication track through the transmit contact surface of the segmented wheel.

16. The charging control system of claim 11, wherein the processor is further caused to:
identify the receive contact surface of the segmented wheel is in connection with the power-communication track;
receive an incoming communication message on the power-communication track through the receive contact surface of the segmented wheel; and
transmit an acknowledgement message, through the transmit contact surface, on the power-communication track on successful reception of the incoming communication message.

17. A charging control unit for controlling charging of a line follower robot, the charging control unit comprising:
a line follower robot configured with a charging control system, wherein the line follower robot follows a pre-programmed path to perform a pre-programmed task,
the line follower robot comprising:
a ground contact wheel in connection with the pre-programmed path for an entire duration of performance of the pre-programmed task; and
a segmented wheel in connection with a power-communication track, wherein the segmented wheel is divided into an equal number of different contact surfaces, and wherein the different contact surfaces comprises a charging contact surface, a transmit contact surface, and a receive contact surface; and the power-communication track constructed parallel to the pre-programmed path.

18. The charging control unit of claim 17, wherein the power-communication track is powered by a power supply and communication unit to charge a battery of the line follower robot through the charging contact surface of the segmented wheel.

19. The charging control unit of claim 18, wherein the battery of the line follower robot is charged when the charging contact surface of the segmented wheel is in connection with the power-communication track.

20. The charging control unit of claim 17, wherein the charging control system transmits at least one of a level of a battery of the line follower robot, a location of the line follower robot, and task to be performed by the line follower robot to a power supply and communication unit.

* * * * *